(12) United States Patent
Yasuda et al.

(10) Patent No.: US 9,586,508 B2
(45) Date of Patent: Mar. 7, 2017

(54) VEHICLE SEAT (71) Applicant: NHK SPRING CO., LTD., Yokohama-shi (JP)

(72) Inventors: Kenzo Yasuda, Yokohama (JP); Hiroshi Kushiku, Yokohama (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/788,514

(22) Filed: Jun. 30, 2015

(65) Prior Publication Data

US 2016/0001689 A1    Jan. 7, 2016

(30) Foreign Application Priority Data

Jul. 3, 2014   (JP) .................. 2014-138032

(51) Int. Cl.
| | |
|---|---|
| B60N 2/70 | (2006.01) |
| B60N 2/48 | (2006.01) |
| B60N 2/68 | (2006.01) |
| B60N 2/72 | (2006.01) |
| B60N 2/42 | (2006.01) |
| B60N 2/427 | (2006.01) |
| B60N 2/64 | (2006.01) |

(52) U.S. Cl.
CPC .......... B60N 2/7094 (2013.01); B60N 2/427 (2013.01); B60N 2/4228 (2013.01); B60N 2/42709 (2013.01); B60N 2/42745 (2013.01); B60N 2/48 (2013.01); B60N 2/64 (2013.01); B60N 2/646 (2013.01); B60N 2/68 (2013.01); B60N 2/686 (2013.01); B60N 2/7029 (2013.01); B60N 2/7058 (2013.01); B60N 2/72 (2013.01)

(58) Field of Classification Search
CPC .... B60N 2/7094; B60N 2/4228; B60N 2/427; B60N 2/42709; B60N 2/42745; B60N 2/48; B60N 2/64; B60N 2/646; B60N 2/68; B60N 2/686; B60N 2/7029; B60N 2/7058; B60N 2/72
USPC ......................................... 297/440.2, 452.18
See application file for complete search history.

(56) References Cited

U.S. PATENT DOCUMENTS

| 8,690,255 B2 * | 4/2014 | Yamaki .................... 297/216.14 |
| 8,936,317 B2 * | 1/2015 | Yamaguchi .......... B60N 2/4228 297/452.31 |
| 2014/0265494 A1 * | 9/2014 | Abe .............................. 297/296 |

FOREIGN PATENT DOCUMENTS

| JP | 2009-107571 A | 5/2009 | |
| JP | 5452858 B2 * | 3/2014 | ........... B60N 2/4228 |

* cited by examiner

Primary Examiner — Anthony Barfield
(74) Attorney, Agent, or Firm — Knobbe Martens Olson & Bear LLP (57) ABSTRACT

There is provided a vehicle seat including: a seatback frame that includes a plate-shaped back face panel portion; a headrest; a seatback pad that is provided at a front face side of the seatback frame, with a space formed between the seatback pad and the back face panel portion; a back spring that is formed from wire and includes left and right side portions extending in an up-down direction of the seatback, at both seat width direction sides inside the space, and includes a lower portion coupling together lower end portions of the left and right side portions in the seat width direction, wherein the left and right side portions are supported so as to be capable of undergoing displacement toward a seat width direction outer side with respect to the seatback frame, and support the seatback pad from a seat rear side.

7 Claims, 9 Drawing Sheets

VEHICLE SEAT

CROSS-REFERENCE TO RELATED APPLICATION

This application is based on and claims priority under 35 USC 119 from Japanese Patent Application No. 2014-138032 filed on Jul. 3, 2014, the disclosure of which is incorporated by reference herein.

BACKGROUND

Technical Field

The present invention relates to a vehicle seat.

Related Art

In a vehicle seat described in Japanese Patent Application Laid-Open (JP-A) No. 2009-107571, a pad member (seatback pad) of a seatback is supported from the seat rear side by a planar spring structure. The planar spring structure is formed in a lattice shape from wire, and is coupled to a seatback frame by connecting wires. The planar spring structure resiliently supports the seatback pad from the seat rear side, enabling the comfort (ride comfort) of a seated occupant to be secured during normal operation.

In the event of a rear-end shunt (a rear-end collision), load from the seated occupant moving toward the seat rear side under inertia is input to the planar spring structure, thereby releasing a coupled state between the planar spring structure and the connecting wires, or between the connecting wires and the seatback frame. The back and waist of the seated occupant accordingly enter into the seatback, and the head of the seated occupant is swiftly supported by a headrest. This thereby enables a reduction in whiplash injury, thereby contributing to improved occupant protection performance.

Recently, seatback frames are sometimes formed entirely from resin, for example in the interests of reducing the weight of a vehicle seat. There are demands to improve rear-end collision occupant protection performance, while securing the comfort of a seated occupant during normal operation, in vehicle seats provided with such resin seatback frames.

SUMMARY

In consideration of the above circumstances, an object of the present invention is to provide a vehicle seat provided with a resin seatback frame, that contributes to improved rear-end collision occupant protection performance, while securing the comfort of a seated occupant during normal operation.

A first aspect of the present invention provides a vehicle seat including:

seatback frame formed from resin that configures a framework of a seatback, and that includes a plate-shaped back face panel portion disposed at a back face of the seatback;

a headrest that is provided at an upper end portion of the seatback;

a seatback pad that is provided at a front face side of the seatback frame, with a space formed between the seatback pad and the back face panel portion;

a back spring that is formed from wire and includes left and right side portions extending in an up-down direction of the seatback, at both seat width direction sides inside the space, and includes a lower portion coupling together lower end portions of the left and right side portions in the seat width direction, wherein the left and right side portions are supported so as to be capable of undergoing displacement toward a seat width direction outer side with respect to the seatback frame, and support the seatback pad from a seat rear side.

In the vehicle seat according to the first aspect of the present invention, the resin seatback frame configuring framework of the seatback includes the back face panel portion disposed at the back face of the seatback. A space is formed between the back face panel portion and the seatback pad provided at the front face side of the seatback frame. The back spring, formed from wire, is provided inside the space. The back spring includes the left and right side portions extending in the up-down direction of the seatback at both seat width direction sides inside the space, and the lower portion coupling together the lower end portions of the left and right side portions in the seat width direction. The left and right side portions are supported so as to be capable of undergoing displacement toward the seat width direction outer side with respect to the seatback frame; however this displacement toward the seat width direction outer side is restricted by the lower portion. The seatback pad is resiliently supported from the seat rear side by the left and right side portions, thereby enabling the comfort of the seated occupant to be secured during normal operation.

In a rear-end collision, an excessive load is input to a seat width direction intermediate portion of the seatback pad from the seated occupant moving toward the seat rear side under inertia. The seat width direction intermediate portion of the seatback pad accordingly deforms toward the seat rear side and enters between the left and right side portions. The back spring accordingly deforms such that the left and right side portions undergo displacement toward the seat width direction outer sides, and the seat width direction intermediate portion of the seatback pad deforms still further toward the seat rear side. The back and waist of the seated occupant can accordingly enter inside the seatback, thereby enabling the head of the seated occupant to be swiftly supported by the headrest. Moreover, load from the seated occupant is transmitted to the back face panel portion due to the seat width direction intermediate portion of the seatback pad deforming toward the seat rear side and pressing against the back face panel portion. The back and waist of the seated occupant are accordingly supported by the back face panel portion of the seatback frame. Due to the above, a contribution is made to improving occupant protection performance in the event of a rear-end collision.

A second aspect of the present invention provides the vehicle seat of the first aspect, further including left and right guide portions that are disposed at the seatback frame, that abut or face the left and right side portions from the seat rear side, and that are angled toward the seat rear side on progression toward the seat width direction outer side.

In the vehicle seat of the second aspect of the present invention, during deformation of the back spring such that the left and right side portions undergo displacement toward the seat width direction outer side as described above, the displacement direction of the left and right side portions can be guided toward the seat width direction outer side and the seat rear side by the left and right guide portions. This thereby enables the left and right side portions to be prevented from undergoing displacement in unintended directions.

A third aspect of the present invention provides the vehicle seat of the first aspect, wherein a deformation origin portion at which the lower portion has been locally plastically deformed is provided at a seat width direction intermediate portion of the lower portion.

In the vehicle seat of the third aspect of the present invention, during deformation of the back spring such that the left and right side portions undergo displacement toward the seat width direction outer side as described above, stress is concentrated on the deformation origin portion provided at the seat width direction intermediate portion of the lower portion. This thereby enables the back spring to deform about an origin at the deformation origin portion, this contributing to making the back spring deform as intended.

A fourth aspect of the present invention provides the vehicle seat of the first aspect, further including a coupling member that couples the left and right side portions together in the seat width direction, wherein the coupling member releases the coupling when the left and right side portions are imparted with a load toward the seat width direction outer side of a specific value or greater.

In the vehicle seat of the fourth aspect of the present invention, the left and right side portions of the back spring are coupled together in the seat width direction by the coupling member, thereby enabling the left and right side portions from undergoing unintentional displacement toward the seat width direction outer side during normal operation. However, in the event of a rear-end collision, the seat width direction intermediate portion of the seatback pad enters between the left and right side portions, and the coupling is released when the left and right side portions are imparted with load toward the seat width direction outer side of the specific value or greater. This thereby enables displacement of the left and right side portions toward the seat width direction outer side to be permitted.

As described above, the vehicle seat of the present invention contributes to improved rear-end collision occupant protection performance while securing the comfort of a seated occupant during normal operation in a configuration provided with a resin seatback frame.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a vehicle seat 10 according to a first exemplary embodiment, with reference to FIG. 1 to FIG. 5. In each of the drawings, the arrow FR indicates a seat front direction, the arrow UP indicates a seat upward direction, and the arrow RH indicates the right of the seat (one side in a seat width direction), as appropriate. The front and rear, upward and downward, and left and right directions of the vehicle seat 10 correspond to the front and rear, upward and downward, and left and right directions of the vehicle. In the following explanation, unless specifically indicated otherwise, reference to front, rear, upward, downward, left, and right directions refer to the front, rear, upward, downward, left, and right directions of the vehicle seat 10.

Figure 1:
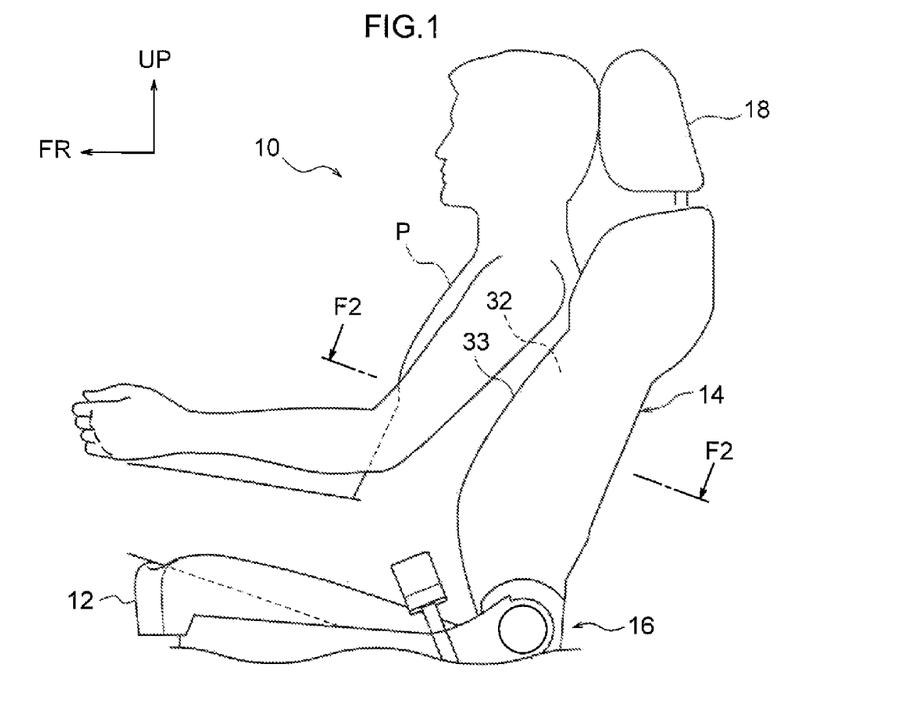
FIG. 1 is a side view illustrating configuration of relevant portions of a vehicle seat according to a first exemplary embodiment of the present invention.
Figure 2:
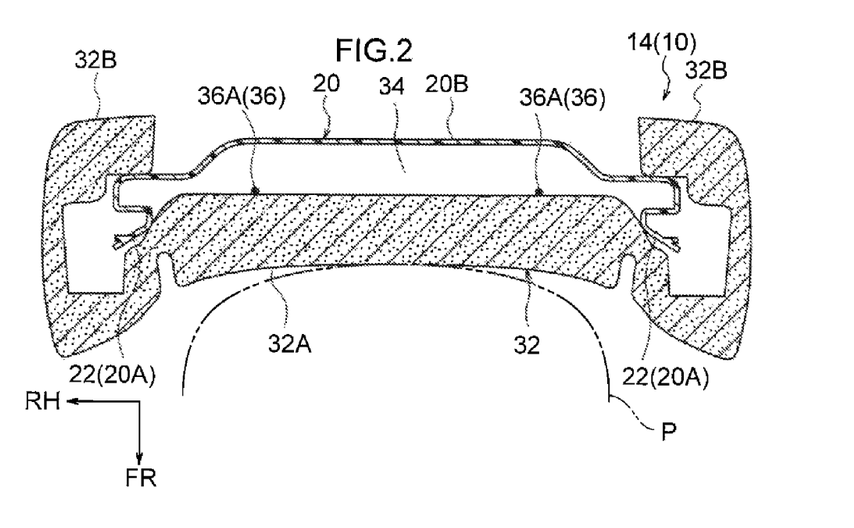
FIG. 2 is an enlarged cross-section taken along line F2-F2 in FIG. 1.
Figure 3:
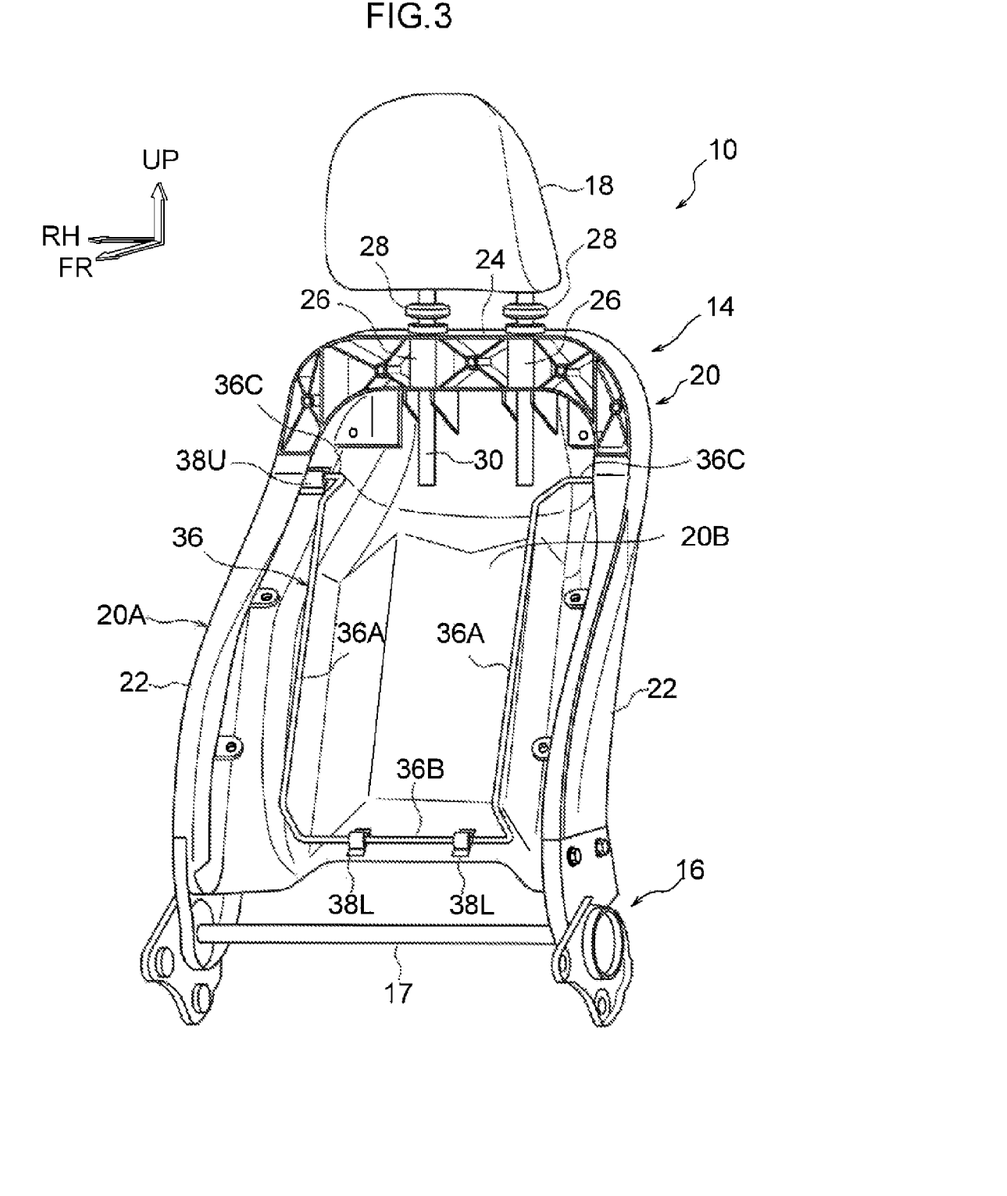
FIG. 3 is a perspective view illustrating configuration of peripheral members, including a seatback frame and a back spring, provided to the vehicle seat illustrated in FIG. 1.

As illustrated in FIG. 1 to FIG. 3, the vehicle seat 10 includes a seat cushion 12 that supports the buttocks and thighs of a seated occupant P. The seat cushion 12 is coupled to a vehicle body floor (not illustrated in the drawings) by a known sliding mechanism (not illustrated in the drawings). The vehicle seat 10 further includes a seatback 14 that supports the back of the seated occupant P. A lower end portion of the seatback 14 is coupled to a rear end portion of the seat cushion 12 through a reclining mechanism 16. A headrest 18 that supports the head of the seated occupant P is provided at an upper end portion of the seatback 14.

The seatback 14 includes a seatback frame 20, a seatback pad 32 (see FIG. 2 and FIG. 5: omitted from illustration in FIG. 3), and a back spring 36. Explanation follows regarding the respective configuration elements of the seatback 14.

Seatback Frame 20 Configuration

The seatback frame 20 configures framework of the seatback 14, and overall, is formed from a resin (such as carbon fiber reinforced plastic) in what is known as a shell shape. The seatback frame 20 is configured including a frame portion 20A configuring an outer peripheral portion of the seatback frame 20, and a back face panel 20B disposed at a rear end side (back face side) of the frame portion 20A. The frame portion 20A and the back face panel 20B are formed integrally to one another.

The frame portion 20A is formed substantially in an inverted U-shape, open toward the seat lower side as viewed from the front. The frame portion 20A is configured including a pair of left and right side frame portions 22 configuring side portions of the seatback frame 20 on both sides in the seat width direction, and an upper frame 24 configuring an upper portion of the seatback frame 20. The left and right side frame portions 22 are substantially plate-shaped, and extend along the seat up-down direction with their plate thickness directions in the seat width direction. A rear end portion of a seat cushion frame (not illustrated in the drawings), this being a framework member of the seat cushion 12, is coupled to lower end portions of the left and right side frame portions 22 through the reclining mechanism 16. Note that the seatback up-down direction used in the following explanation is a direction linking between a connecting rod 17 provided to the reclining mechanism 16 and the upper frame portion 24, as viewed from the side of the seat.

The upper frame portion 24 extends in the seat width direction, and couples together upper end portions of the left and right side frame portions 22. The upper frame portion 24 is formed with a pair of left and right support portions 26. The support portions 26 are each formed in substantially rectangular tube shapes, with their axial direction along the seat up-down direction. Respective headrest supports 28 are attached inside the support portions 26. A headrest frame 30, this being a framework member of the headrest 18, is mounted on the headrest supports 28. The headrest 18 is thereby coupled to the upper end portion of the seatback frame 20.

The back face panel 20B is formed substantially in a plate shape, and is disposed at a back face of the seatback 14 with its plate thickness direction along the seat front-rear direction. The back face panel 20B is formed integrally to the frame portion 20A, and an outer peripheral portion of the back face panel 20B is joined integrally to a rear end portion of the frame portion 20A. As illustrated in FIG. 2, a seat width direction intermediate portion of the back face panel 20B bulges out further to the seat rear side than both seat width direction end portions thereof. The seatback pad 32 is provided at a front face side of the seatback frame 20 configured as described above.

Seatback Pad 32 Configuration

The seatback pad 32 is formed from a foamed body such as a urethane foam, and is attached to the seatback frame 20 from the seat front side. A front face of the seatback pad 32 is covered by a covering member 33, not illustrated in the drawings. The seatback pad 32 is configured by a pad body 32A that supports the waist and back of the seated occupant P, and a pair of left and right pad side portions 32B that are integrally formed at both left and right side portions of the pad body 32A. The pad body 32A configures a seat width direction intermediate portion of the seatback pad 32, and the pad side portions 32B configure side portions on both seat width direction sides of the seatback pad 32.

The left and right pad side portions 32B are each formed with an open cross-section profile, opening toward the seat width direction inside. The left and right side frame portions 22 are fitted into the pad side portions 32B. The pad body 32A is disposed at the seat front side of the back face panel 20B, and couples together the left and right pad side portions 32B in the seat width direction. A space 34 is thrilled between the pad body 32A and the back face panel 20B. The back spring 36 is provided inside the space 34.

Back Spring 36 Configuration

Figure 4:
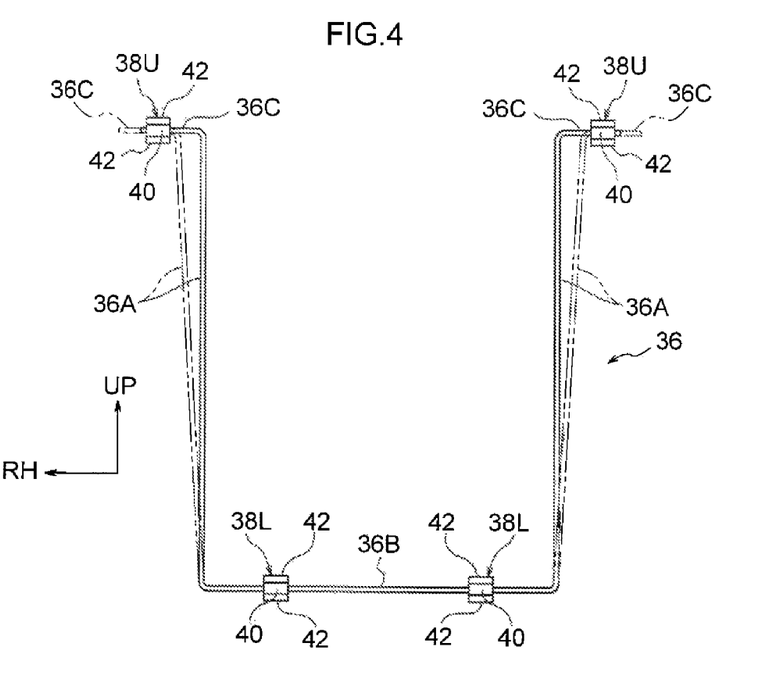
FIG. 4 is a front view illustrating configuration of a back spring, and support portions that support the back spring, according to a first exemplary embodiment.

As illustrated in FIG. 2 to FIG. 4, the back spring 36 is formed by bending a wire configured by metal wire, for example spring steel wire. The back spring 36 is formed in a substantially U-shape (substantially an inverted hat shape) open toward the upper side of the seatback 14 as viewed from the front side of the seatback 14. The back spring 36 is integrally provided with a pair of left and right side portions 36A positioned on both seat width direction sides inside the space 34, and a lower portion 36B positioned at a lower end side inside the space 34.

The left and right side portions 36A each extend along the seatback up-down direction at left and right side portions of the seatback 14, and are bent diagonally toward the back face panel 20B side at an upper end side and a lower end side. As illustrated in FIG. 2, an up-down direction intermediate portion of each side portion 36A abuts a back face of the pad body 32A. Note that in order to make the left and right side portions 36A more easily visible, the cross-sections of the left and right side portions 36A are shaded black in FIG. 2 and FIG. 5.

The lower portion 36B extends along the seat width direction at a lower end portion of the seatback 14, and couples together lower end portions of the left and right side portions 36A in the seat width direction. The lower portion 36B either abuts a front face of the back face panel 20B, or faces the front face of the back face panel 20B from close proximity.

Upper end portions of the left and right side portions 36A are positioned at an upper portion of the seatback 14, and are bent toward the seat width direction outer sides. The upper end portions of the left and right side portions 36A accordingly form supported portions 36C, respectively extending in straight lines toward the seat width direction outer sides.

The lower portion 36B and the left and right supported portions 36C are attached to the seatback frame 20 by respective pairs of left and right attachment members 38U, 38L. Each of the attachment members 38U, 38L is, for example, formed from resin, and is configured by a wire holder 40 curved in a circular arc shape, and a pair of flanges 42 extending out from both curve direction ends of the wire holder 40.

The respective pairs of flanges 42 of the left and right attachment members 38L, disposed at the lower end portion of the seatback frame 20, are joined to the front face of the back face panel 20B by bonding, welding, or the like, in an inserted state of the lower portion 36B into the respective wire holders 40. The lower portion 36B, namely a lower end portion of the back spring 36, is thereby attached to the lower end portion of the seatback frame 20 by the left and right attachment members 38L.

The respective pairs of flanges 42 of the left and right attachment members 38U, disposed at an upper end side of the seatback frame 20, are joined to the left and right side frame portions 22 by bonding, welding, or the like, in an inserted state of leading end sides of the supported portions 36C into the respective wire holders 40. The left and right supported portions 36C, namely upper end portions of the back spring 36, are thereby attached to the upper end portion of the seatback frame 20 by the left and right attachment members 38U.

As illustrated in FIG. 4, the left and right side portions 36A are disposed at a separation to each other, further to the seat width direction inside than seat width direction inside end portions of the left and right attachment members 38U. The left and right supported portions 36C are respectively supported by the left and right attachment members 38U so as to be capable of sliding in the seat width direction, this being the axial direction of the supported portions 36C. The left and right side portions 36A are supported by the seatback frame 20 so as to be capable of undergoing displacement toward the seat width direction outer sides; however this displacement is restricted by the lower portion 36B that couples together the lower end portions of the left and right side portions 36A. The pad body 32A is resiliently supported from the seat rear side by the left and right side portions 36A.

Explanation follows regarding operation and advantageous effects of the present exemplary embodiment.

In the vehicle seat 10 configured as described above, the resin seatback frame 20, configuring framework of the seatback 14, is integrally provided with the frame portion 20A, and the back face panel 20B disposed at the back face of the seatback 14. The rigidity of the resin seatback frame 20 can be efficiently secured due to providing the back face panel 20B.

The space 34 is formed between the back face panel 20B described above and the seatback pad 32 provided at the front face side of the seatback frame 20. The back spring 36, formed from wire, is provided inside the space 34. The back spring 36 includes the left and right side portions 36A that extend along the up-down direction of the seatback 14 on both seat width direction sides inside the space 34, and the lower portion 36B that couples together the lower end portions of the left and right side portions 36A in the seat width direction.

The left and right side portions 36A are supported by the seatback frame 20 so as to be capable of undergoing displacement toward the seat width direction outer sides; however this displacement toward the seat width direction outer sides is restricted by the lower portion 36B described above. The left and right side portions 36A support the pad body 32A of the seatback pad 32 resiliently from the seat rear side, thereby enabling the comfort of the seated occupant P to be secured during normal operation.

In a rear-end collision, the seated occupant P moving toward the seat rear side under inertia inputs an excessive load into the pad body 32A of the seatback pad 32. The pad body 32A accordingly deforms toward the seat rear side, entering between the left and right side portions 36A. As a result, the back spring 36 deforms such that the left and right side portions 36A undergo displacement toward the seat width direction outer sides (see the double-dotted intermittent lines in FIG. 4 and the arrows D in FIG. 5), and a seat width direction central side of the pad body 32A deforms still further toward the seat rear side. This thereby enables the back and waist of the seated occupant P to enter the seatback 14, thereby enabling swift support of the head of the seated occupant P by the headrest 18.

Figure 5:
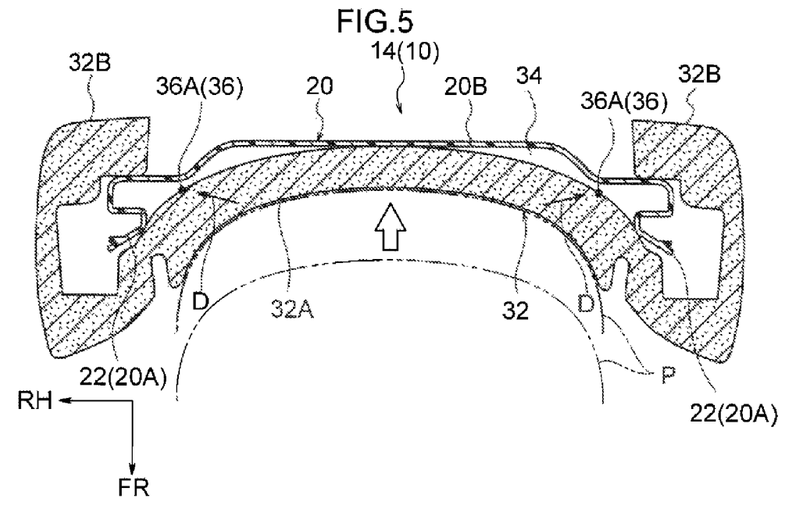
FIG. 5 is a cross-section corresponding to FIG. 2, illustrating a state in which left and right side portions of a back spring have undergone displacement toward seat width direction outer sides due to a seated occupant moving under inertia in a rear-end collision.

Moreover, as illustrated in FIG. 5, the seat width direction central side of the pad body 32A deforms toward the seat rear side and presses against the front face of the back face panel 20B, thereby transmitting load from the seated occupant P to the back face panel 20B. The back and waist of the seated occupant P are accordingly supported by the back face panel 20B of the seatback frame 20 through the pad body 32A. This thereby enables the back face panel 20B of the seatback frame 20 to provide good support to the back and waist of the seated occupant P.

It is conceivable that were the left and right side portions 36A not to undergo displacement to the seat width direction outer sides in the event of a rear-end collision, the left and right side portions 36A could get in the way, preventing the pad body 32A from being pressed against the back face panel 20B. In such cases, the back and waist of the seated occupant P would not be supported by the back face panel 20B, and it is possible that the back and waist could be inadequately supported. However, the present exemplary embodiment enables such an eventuality to be avoided. Due to the above, the present exemplary embodiment contributes to improved occupant protection performance in the event of a rear-end collision.

Next, explanation follows regarding other exemplary embodiments of the present invention. Note that configuration and operation that are basically the same as in the first exemplary embodiment are allocated the same reference numerals as in, the first exemplary embodiment, and explanation thereof is omitted.

Second Exemplary Embodiment

Figure 6:
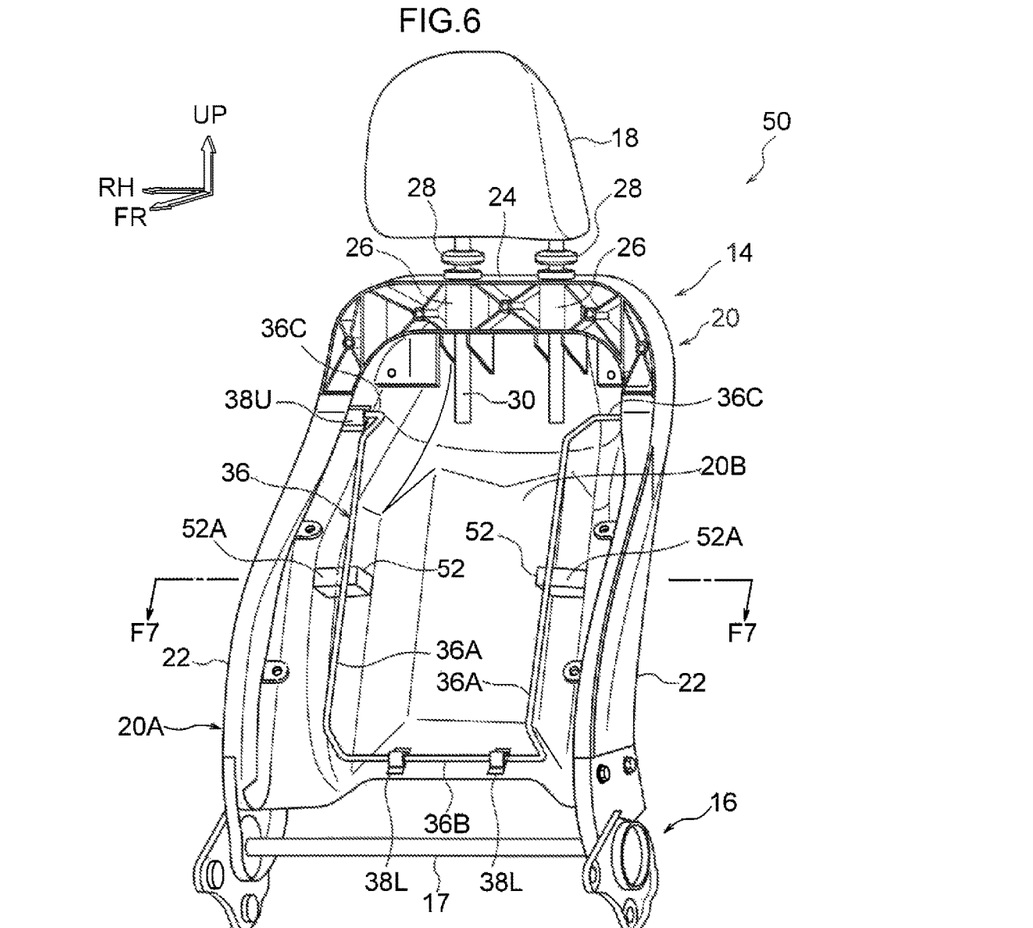
FIG. 6 is a perspective view illustrating configuration of peripheral members, including a seatback frame and a back spring, provided to a vehicle seat according to a second exemplary embodiment of the present invention.
Figure 7:
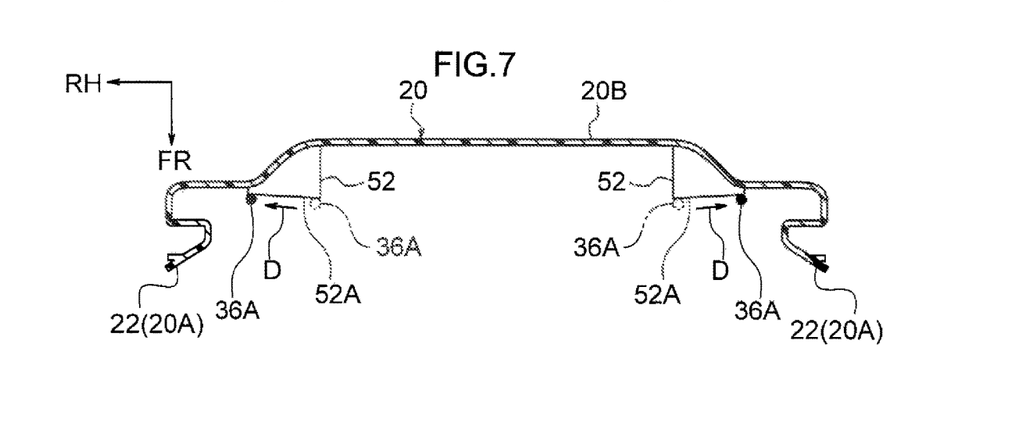
FIG. 7 is an enlarged cross-section taken along line F7-F7 in FIG. 6.

FIG. 6 is a perspective view illustrating configuration of peripheral members, including a seatback frame 20 and a back spring 36, provided to a vehicle seat 50 according to a second exemplary embodiment of the present invention. FIG. 7 illustrates a cross-section taken along line F7-F7 in FIG. 6.

In the present exemplary embodiment, a pair of left and right guide members 52 are provided between the respective left and right side portions 36A of the back spring 36 and the back face panel 20B. The guide members 52 are, for example, formed in block shapes or box shapes from a resin, and are disposed at an up-down direction intermediate portion of the seatback frame 20. Rear end faces of the guide members 52 are joined to the front face of the back face panel 20B by bonding, welding, or the like. Front end faces of the guide members 52 configure guide faces (guide portions) 52A angled toward the seat rear side on progression toward the seat width direction outer sides. The guide faces 52A either abut the left and right side portions 36A, or oppose the left and right side portions 36A from close proximity, from the seat rear side. With the exception of the above, configuration is similar to that of the first exemplary embodiment.

In the present exemplary embodiment, when the back spring 36 deforms such that the left and right side portions 36A undergo displacement toward the seat width direction outer sides, the left and right side portions 36A slide against the left and right guide faces 52A. The displacement direction of the left and right side portions 36A can accordingly be guided toward the seat width direction outer sides and the seat rear side by the left and right guide faces 52A (see the arrow D in FIG. 7). This thereby enables the left and right side portions 36A to be prevented from undergoing displacement in unintended directions.

Third Exemplary Embodiment

Figure 8:
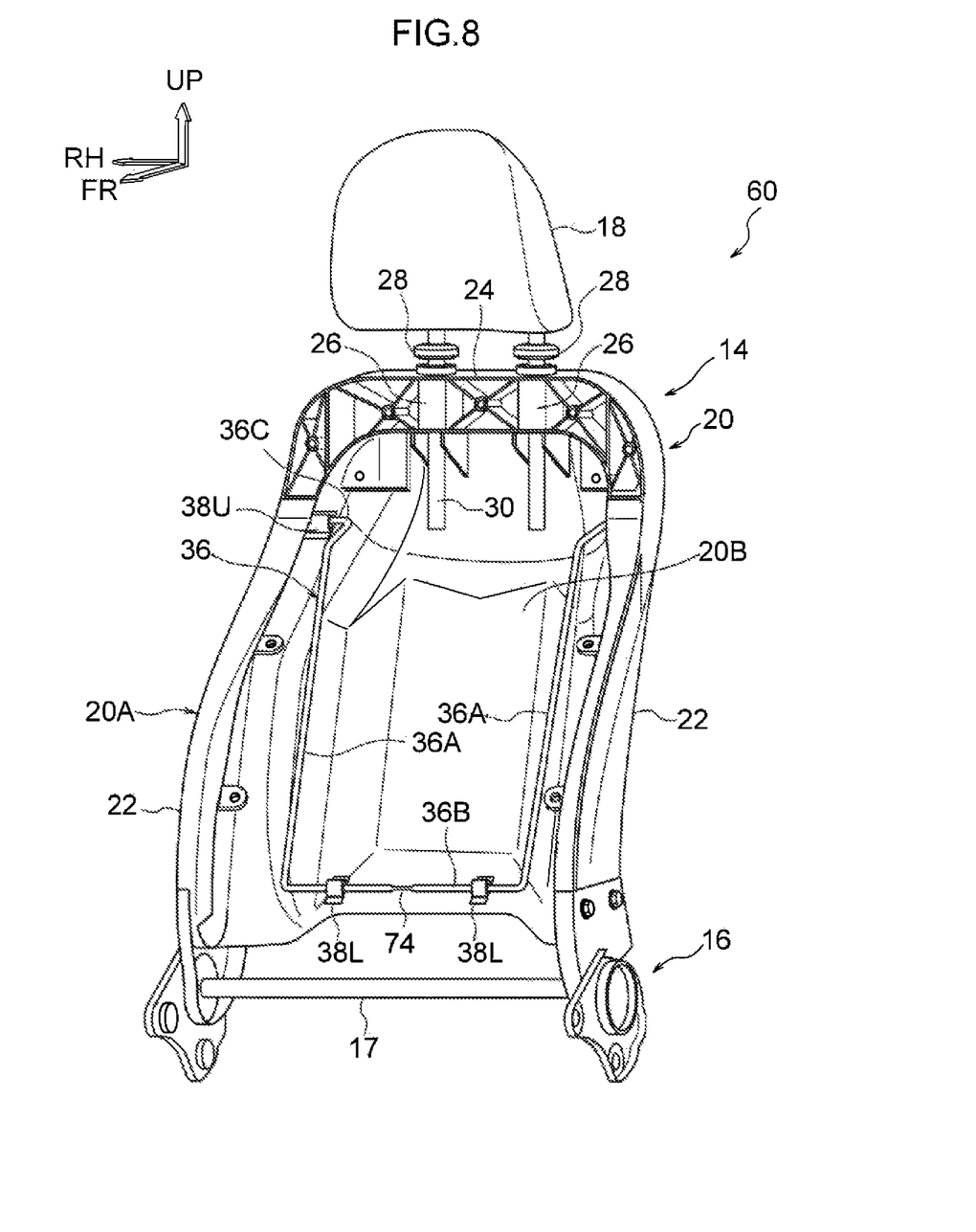
FIG. 8 is a perspective view illustrating configuration of peripheral members, including a seatback frame and a back spring, provided to a vehicle seat according to a third exemplary embodiment of the present invention.
Figure 9:
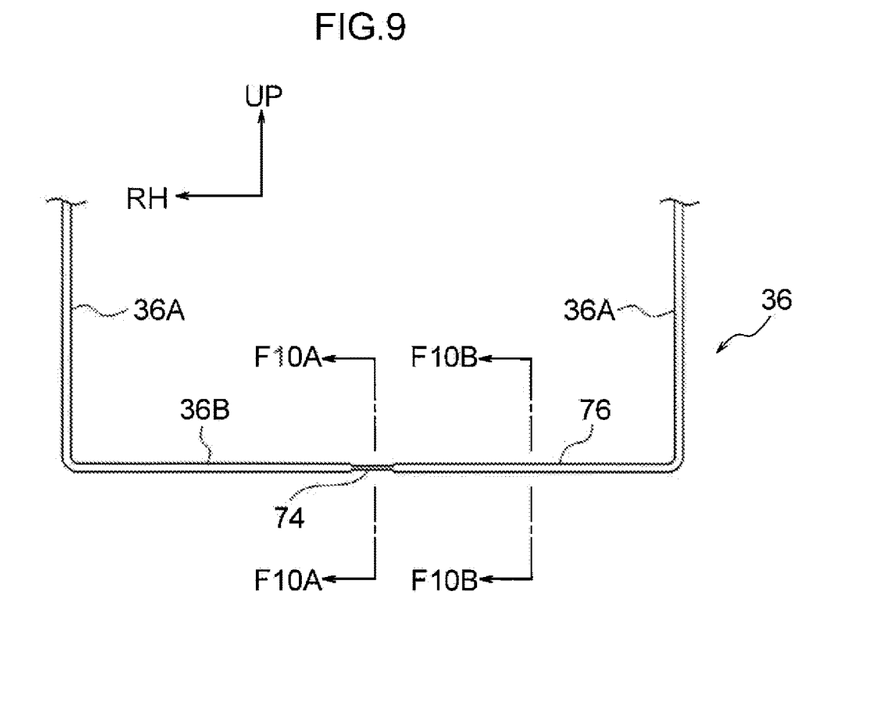
FIG. 9 is a front view illustrating configuration of a lower end portion side of a back spring according to the third exemplary embodiment.
Figure 10A:
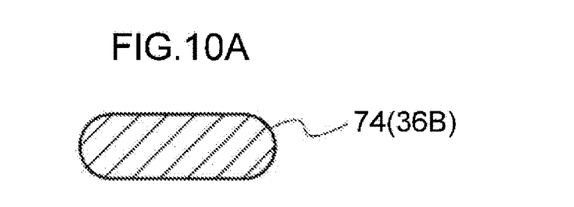
FIG. 10A is an enlarged cross-section taken along line F10A-F10A in FIG. 9.
Figure 10B:
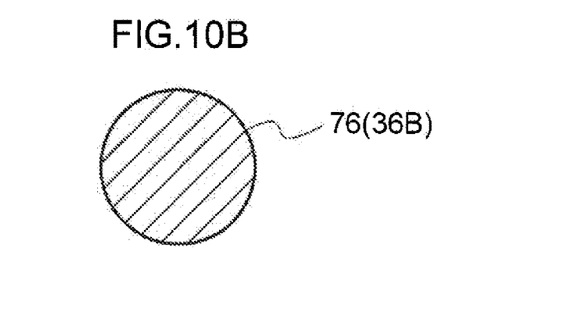
FIG. 10B is an enlarged cross-section taken along line F10B-F10B in FIG. 9.

FIG. 8 is a perspective view illustrating configuration of peripheral members, including a seatback frame 20 and a back spring 36, provided to a vehicle seat 60 according to a third exemplary embodiment of the present invention. As illustrated in FIG. 8 and FIG. 9, in the present exemplary embodiment, a flattened portion 74, serving as a deformation origin portion, is formed to a seat width direction intermediate portion (a seat width direction central portion in this example) of the lower portion 36B of the back spring 36. The flattened portion 74 is formed by locally flattening (plastically deforming) the cross-section of the lower portion 36B along the seatback up-down direction (see FIG. 10A). Locations 76 of the lower portion 36B not formed with the flattened portion 74 are formed with a circular shaped cross-section, as illustrated in FIG. 10B. With the exception of the above, configuration is similar to that of the first exemplary embodiment.

In the present exemplary embodiment, stress is concentrated on the flattened portion 74 during deformation of the back spring 36 to displace the left and right side portions 36A toward the seat width direction outer sides. This thereby enables the back spring 36 to be deformed about an origin at the flattened portion 74, such that the back spring 36 can be made to deform as intended.

Fourth Exemplary Embodiment

Figure 11:
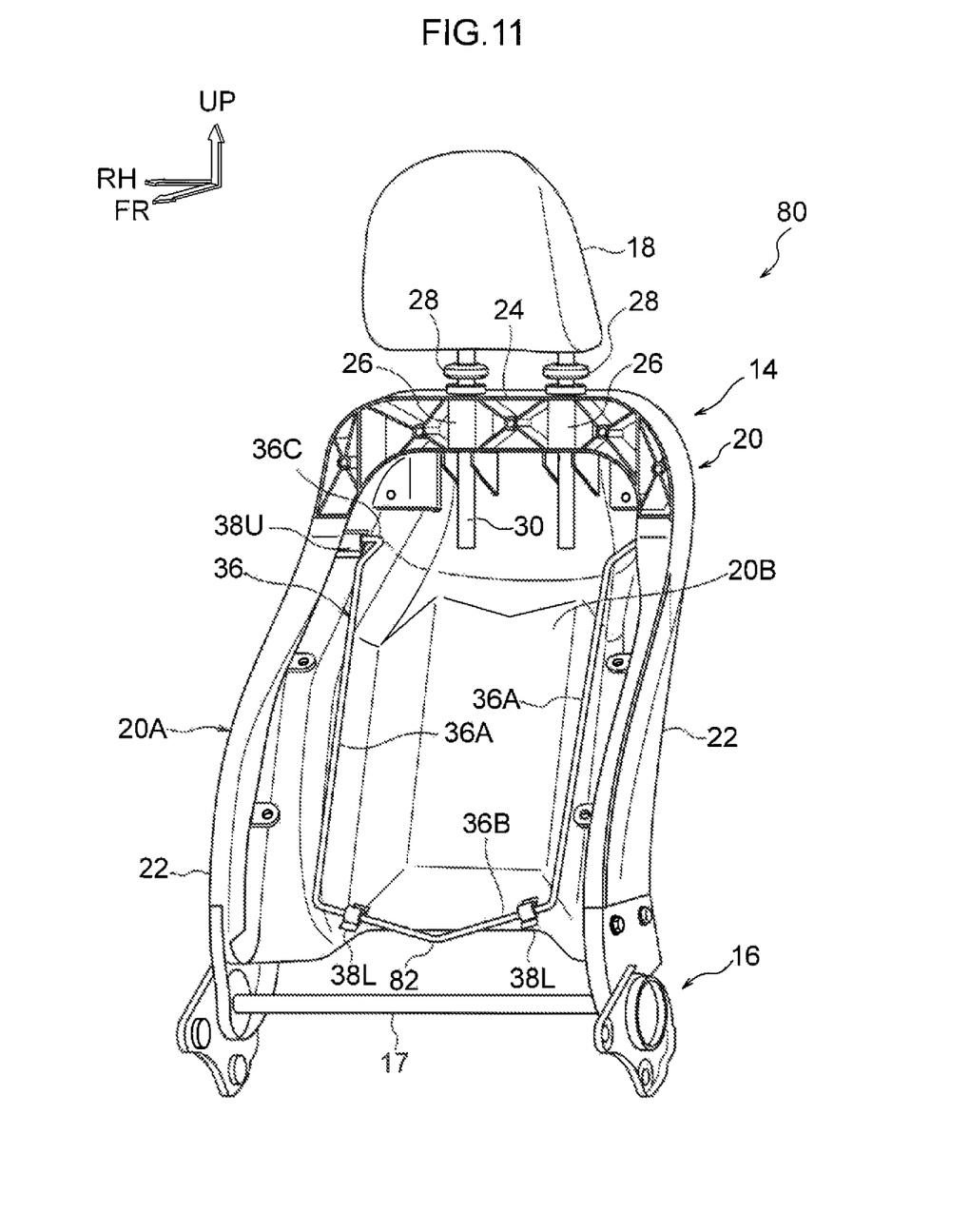
FIG. 11 is a perspective view illustrating configuration of peripheral members, including a seatback frame and a back spring, provided to a vehicle seat according to a fourth exemplary embodiment of the present invention.

FIG. 11 is a perspective view illustrating configuration of peripheral members, including a seatback frame 20 and a back spring 36, provided to a vehicle seat 80 according to a fourth exemplary embodiment of the present invention. In the present exemplary embodiment, a seat width direction intermediate portion (a seat width direction central portion in this example) of the lower portion 36B of the back spring 36 is formed with a bent portion 82, serving as a deformation origin portion, in place of the flattened portion 74 of the third exemplary embodiment. The bent portion 82 is bent into a substantially V-shape, protruding toward the seatback lower side. With the exception of the above, configuration is similar to that of the first exemplary embodiment.

In the present exemplary embodiment, stress is concentrated on the bent portion 82 during deformation of the back spring 36 to displace the left and right side portions 36A toward the seat width direction outer sides. This thereby enables the back spring 36 to be deformed about an origin at the bent portion 82, such that the back spring 36 can be made to deform as intended.

Fifth Exemplary Embodiment

Figure 12:
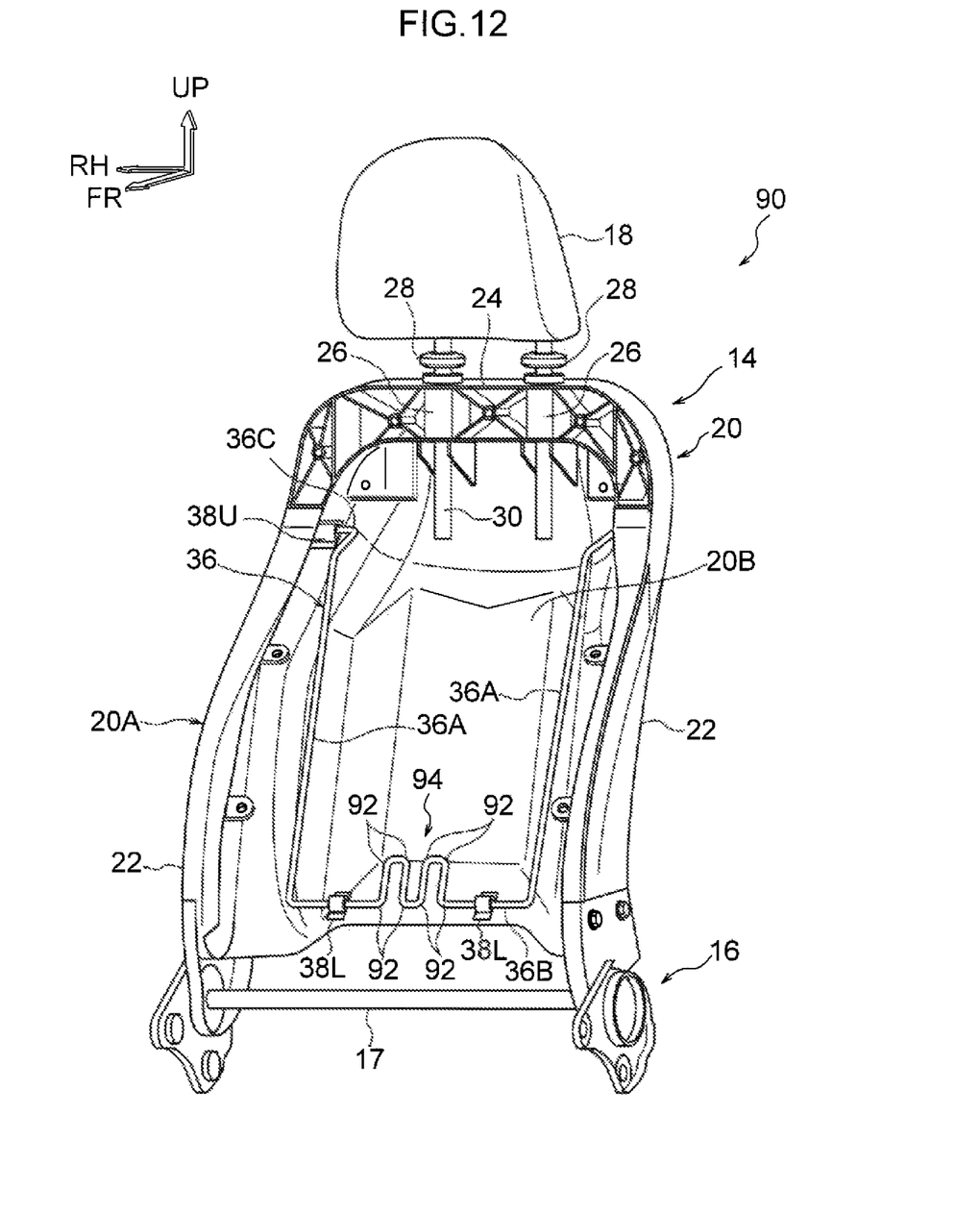
FIG. 12 is a perspective view illustrating configuration of peripheral members, including a seatback frame and a back spring, provided to a vehicle seat according to a fifth exemplary embodiment of the present invention.

FIG. 12 is a perspective view illustrating configuration of peripheral members, including a seatback frame 20 and a back spring 36, provided to a vehicle seat 90 according to a fifth exemplary embodiment of the present invention. In the present exemplary embodiment, a seat width direction intermediate portion (a seat width direction central portion in this example) of the lower portion 36B of the back spring 36 is formed with an extra length portion 94, serving as a deformation origin portion, in place of the flattened portion 74 of the third exemplary embodiment. The extra length portion 94 is formed by forming plural curved portions 92 at the seat width direction central portion of the lower portion 36B, such that the seat width direction central portion is formed in a substantially M-shape as viewed from the front side of the seatback. The extra length portion 94 projects out in a direction intersecting with the seat width direction (toward the seatback upper side in this example). With the exception of the above, configuration is similar to that of the first exemplary embodiment.

In the present exemplary embodiment, stress is concentrated on the extra length portion 94 during deformation of the back spring 36 to displace the left and right side portions 36A toward the seat width direction outer sides. This thereby enables the back spring 36 to be deformed about an origin at the extra length portion 94, such that the back spring 36 can be made to deform as intended.

Sixth Exemplary Embodiment

Figure 13:
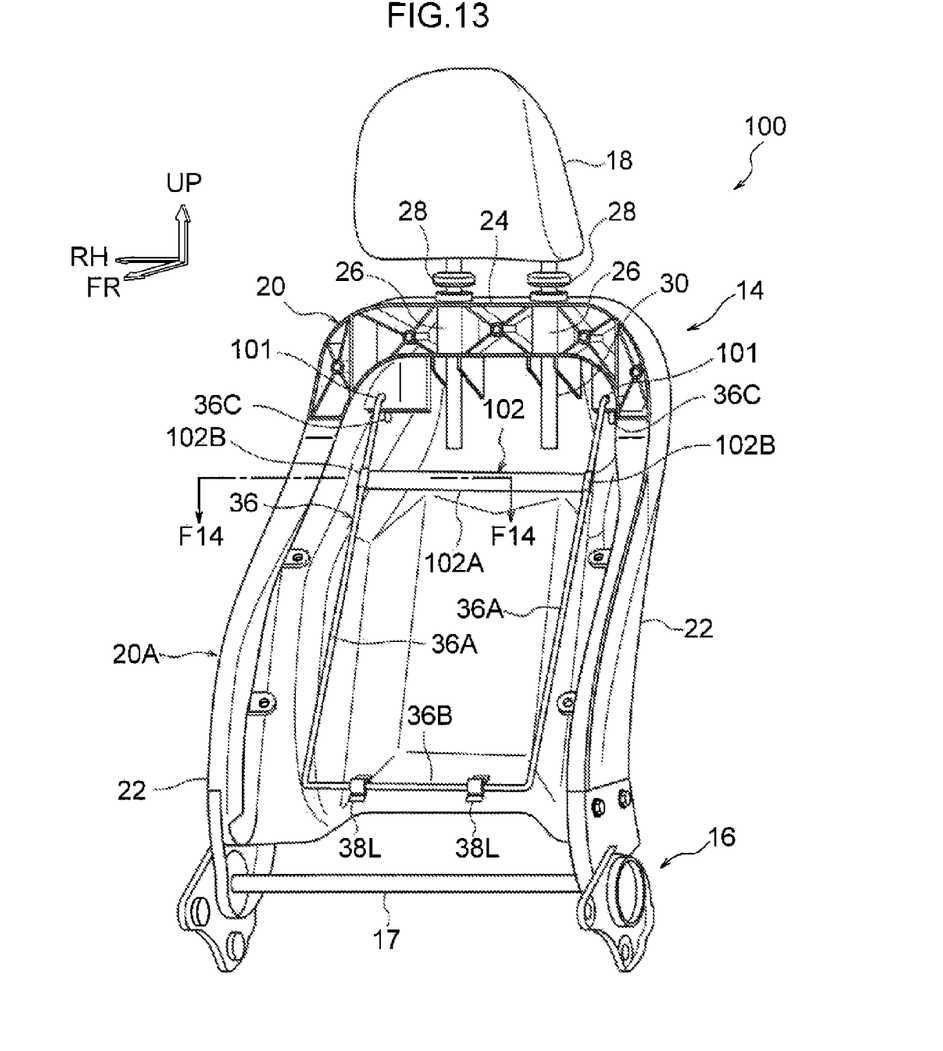
FIG. 13 is a perspective view illustrating configuration of peripheral members, including a seatback frame and a back spring, provided to a vehicle seat according to a sixth exemplary embodiment of the present invention.

FIG. 13 is a perspective view illustrating configuration of peripheral members, including a seatback frame 20 and a back spring 36, provided to a vehicle seat 100 according to a sixth exemplary embodiment of the present invention. In the present exemplary embodiment, the left and right supported portions 36C of the back spring 36 extend at an incline toward the seat rear side and the seat lower side from the upper end portions of the left and right side portions 36A. The supported portions 36C are inserted into a pair of left and right attachment holes 101 formed at an upper portion of the seatback frame 20. The upper end portions of the left and right side portions 36A are thereby supported by the seatback frame 20. The upper end portions of the left and right side portions 36A are thereby restricted from undergoing displacement toward the seat width direction outer sides. However, up-down direction intermediate portions of the left and right side portions 36A are capable of undergoing resilient deformation so as to be displaced toward the seat width direction outer sides.

Figure 14:
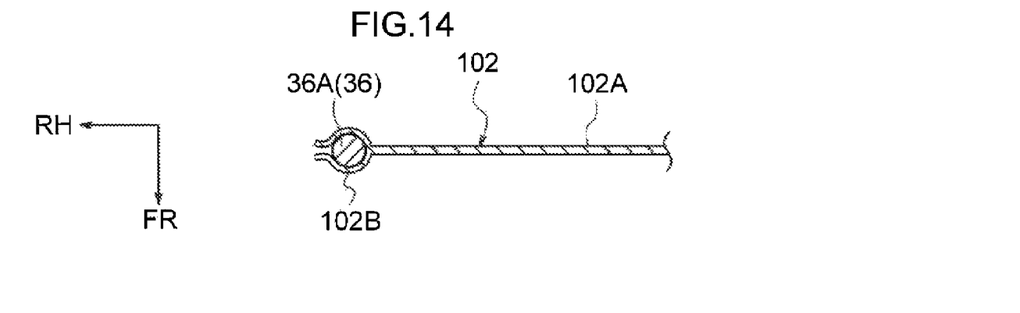
FIG. 14 is an enlarged cross-section taken along line F14-F14 in FIG. 13.

Moreover, in the present exemplary embodiment, a coupling member 102 is provided so as to couple together upper portions of the left and right side portions 36A in the seat width direction. The coupling member 102 includes a member body 102A, formed from resin in an elongated flat plate shape, for example. The member body 102A is disposed with its length direction running along the seat width direction, and with its plate thickness direction oriented in the seat front-rear direction. Both length direction end portions of the member body 102A are integrally provided with engagement portions 102B. The engagement portions 102B are each formed with a substantially C-shaped cross-section profile opening toward the seat width direction outer side as viewed along the seatback up-down direction, such that the left and right side portions 36A fit inside the respective engagement portions 102B. Upper portions of the left and right side portions 36A are thereby coupled together by the coupling member 102. The engagement portions 102B are configured to release the coupling when the left and right side portions 36A are imparted with load toward the seat width direction outer sides of a specific value or greater (a preset value or greater). With the exception of the above, configuration is similar to that of the first exemplary embodiment.

In the present exemplary embodiment, the upper portions of the left and right side portions 36A of the back spring 36 are coupled together in the seat width direction by the coupling member 102, thereby enabling upper portion sides of the left and right side portions 36A to be prevented from undergoing unintended displacement toward the seat width direction outer sides during normal operation. However, in the event of a rear-end collision, the pad body 32A of the seatback pad 32 (not illustrated in FIG. 13 or FIG. 14) enters between the left and right side portions 36A, and the left and right side portions 36A are imparted with load toward the seat width direction outer sides of the specific value or greater, thereby releasing the coupling. This thereby enables displacement of the left and right side portions 36A toward the seat width direction outer side to be permitted.

Explanation has been given above regarding several exemplary embodiments of the present invention. However various modifications may be implemented within a range not departing from the spirit of the present invention. It goes without saying that the scope of rights encompassed by the present invention is not limited to the respective exemplary embodiments described above.

What is claimed is:
1. A vehicle seat comprising:
a seatback frame formed from resin that configures a framework of a seatback, and that includes a plate-shaped back face panel portion disposed at a back face of the seatback and side frame portions configuring side portions of the seatback frame, the back face panel portion and the side frame portions being formed in a single piece;

a headrest that is provided at an upper end portion of the seatback frame;

a seatback pad that is provided at a front face side of the seatback frame, with a space formed between the seatback pad and the back face panel portion;

a back spring that is formed from wire and includes left and right side portions extending in an up-down direction of the seatback, at both seat width direction sides inside the space, and includes a lower portion coupling together lower end portions of the left and right side portions in the seat width direction, wherein the left and right side portions are supported so as to be capable of undergoing displacement toward a seat width direction outer side with respect to the seatback frame, and support the seatback pad from a seat rear side.

2. The vehicle seat of claim 1, further comprising left and right guide portions that are disposed at the seatback frame, that abut or face the left and right side portions from the seat rear side, and that are angled toward the seat rear side on progression toward the seat width direction outer side.

3. The vehicle seat of claim 1, wherein a deformation origin portion at which the lower portion has been locally plastically deformed is provided at a seat width direction intermediate portion of the lower portion.

4. The vehicle seat of claim 1, further comprising a coupling member that couples the left and right side portions together in the seat width direction, wherein the coupling member releases the coupling when the left and right side portions are imparted with a load toward the seat width direction outer side of a specific value or greater.

5. The vehicle seat of claim 1, wherein the upper end portions of the left and right side portions form supported portions, respectively extending in straight lines toward the seat width direction outer sides, and the supported portions are respectively supported by the left and right attachment members so as to be capable of sliding in the seat width direction, this being the axial direction of the supported portions.

6. The vehicle seat of claim 1, wherein the back spring is formed in a substantially U-shape as viewed from the front side of the seatback.

7. A vehicle seat comprising:

a seatback frame formed from resin that configures a framework of a seatback, and that includes a plate-shaped back face panel portion disposed at a back face of the seatback;

a headrest that is provided at an upper end portion of the seatback;

a seatback pad that is provided at a front face side of the seatback frame, with a space formed between the seatback pad and the back face panel portion; and a back spring that is formed from wire and includes left and right side portions extending in an up-down direction of the seatback, at both seat width direction sides inside the space, and includes a lower portion coupling together lower end portions of the left and right side portions in the seat width direction, wherein the left and right side portions are supported so as to be capable of undergoing displacement toward a seat width direction outer side with respect to the seatback frame, and support the seatback pad from a seat rear side, wherein a deformation origin portion at which the lower portion has been locally plastically deformed is provided at a seat width direction intermediate portion of the lower portion, and the deformation origin portion being formed by plastically deforming a cross-section of the lower portion along the up-down direction.

* * * * *